Sept. 4, 1962 H. BÄHRING ET AL 3,052,809

FOCUSING SYSTEM FOR STORAGE TUBES WITH IMAGE SECTION

Filed Sept. 14, 1959

Jnventors:
Herbert Bähring
Friedrich Bender by Michael S. Striker
Attorney

United States Patent Office 3,052,809

Patented Sept. 4, 1962

3,052,809
FOCUSING SYSTEM FOR STORAGE TUBES WITH IMAGE SECTION

Herbert Bähring, Darmstadt, and Friedrich Bender, Weiterstadt, near Darmstadt, Germany, assignors to Fernseh G.m.b.H., Darmstadt, Germany Filed Sept. 14, 1959, Ser. No. 839,802
Claims priority, application Germany Sept. 13, 1958
9 Claims. (Cl. 313—84)

When using storage tubes having an image section and a long focusing coil it was formerly usual to provide between the deflection system and the focusing coil a screening cylinder of ferromagnetic material, for example, mumetal. The purpose of this cylinder is to keep the lines of force together in a restricted space, so that any stray field is suppressed and the deflection power which is necessary is reduced. It would be expected, however, that despite the screening lines of force of the deflection field encroach into the image converter section of the pickup tube and there give rise to a lack of definition in the formation of the image, which becomes apparent as a reduced resolution of the camera. In an RCA type 5820 image orthicon, for example, a resolution of about 28% of the black-white amplitude is obtained at 5 mc./s., that is, on scanning a pattern of black and white bars the amplitude of the picture signal variation for bars set at a pitch which on scanning yields a frequency of 5 mc./s., amounts to only 28% of the signal amplitude for patterns of larger pitch where the amplitude corresponds to the full difference between black and white. The size of the focused scanning spot in the pickup tube, on the other hand, is such as to make possible a higher resolution. It is thus apparent that despite the screening, there must still be some effect due to the stray field.

Various ways of reducing this distortion have been investigated. It has, for example, been proposed to provide the image converter section with an auxiliary coil which generates a compensating deflection field. To carry this into practice, however, proves to be relatively difficult, since the frequency spectrum of the stray field is different from that of the original deflection field owing to the effect of eddy currents, so that the current flowing in the compensating coils cannot be the same as in the main deflecting coils.

It has now been found that the quality of image formation can be substantially improved if the interior, and preferably also the exterior, of the focusing coil is clad with a sheath of highly conductive material, e.g., copper or aluminium, an interruption or separating joint being provided in the inner part of the screening sheath, at that position at which the transition occurs between the image section of the pickup tube and the deflection space. Alternatively, the whole of the interior of the coil in the region of the image section may be free from the screening material.

Figure 1:
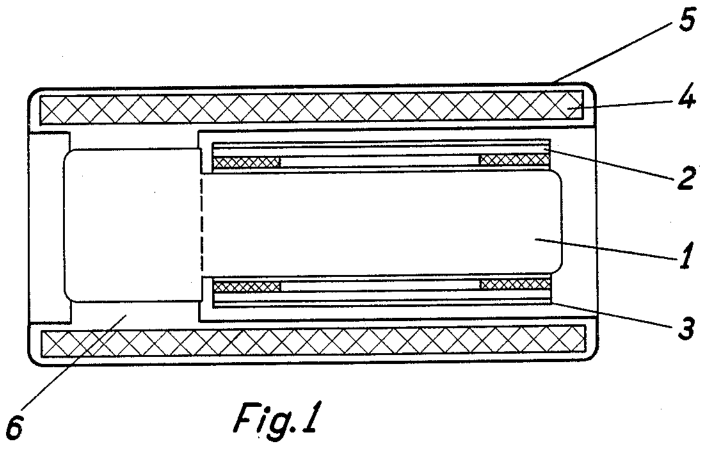

FIGURE 1 shows an embodiment of the invention. In this figure, 1 is an image-orthicon pickup tube, on the neck of which are placed the deflection coils 2 and the ferromagnetic sheath 3. The tube is completely surrounded by a long focusing coil 4. Numeral 5 indicates the screening sheath of the focusing coil, which is interrupted at 6 by a gap which extends over almost the whole length of the image section.

Figure 2:
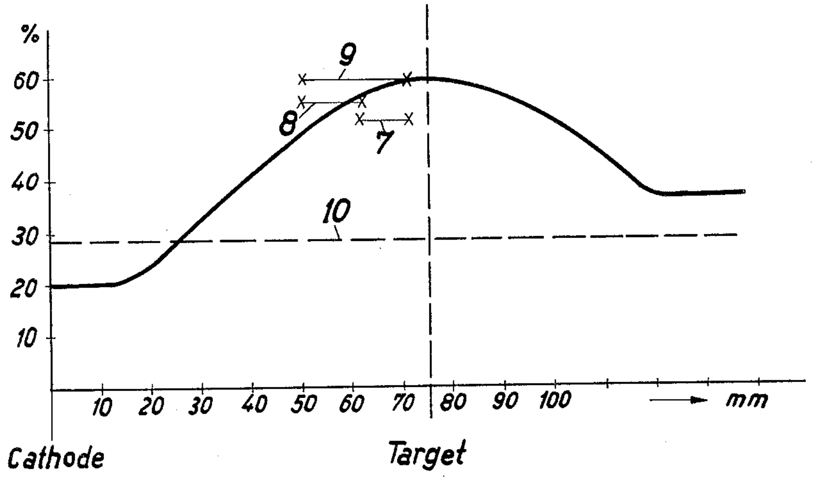

FIGURE 2 is a graph showing how the resolution of an image-orthicon camera depends upon the length of the gap in the sheath. It can be seen that a sheath completely closed upon itself gives rise to a reduction in resolution from 28 to 20%. If, on the other hand, a gap is provided in the inner surface of the sheath in the region of the image converter section, the resolution of the image increases with increasing gap width from 20% to 60%, that is, to twice the resolution obtained without the screening sheath, and then falls with increasing gap width to 35%. The length of the gap shown on the abscissa of the graph is measured from the photo-cathode end of the tube. The nature of this effect can be explained on the assumption that two influences are effective, namely the additional screening of the conducting sheath and the reduction of eddy current influences by the separating gap.

The line 10 running horizontally at about 28% indicates the resolution which would be obtained, as explained above, with a focusing coil without aluminium screening. The further short lines 7, 8 and 9 show the resolution which is obtained if only short gaps of 10 to 20 mm. in the aluminium cylinder are situated at distances of 10 to 20 mm. from the target.

The use of an aluminium sheath on the focusing coil has also proved advantageous in another respect. This is, that the heat can easily be conducted by this sheath from the interior of the coil to the exterior, so that the problems of maintaining a constant temperature and of cooling the pickup tube can more easily be solved.

The invention is not limited to sheathing the outer and inner surfaces of the coil completely with metal. It may in some cases be advantageous to provide only an inner lining of non-magnetic material, with the gap mentioned above. In addition a further substantial increase in the resolution can in case of need be obtained by employing also additional compensating coil at the photo-cathode end of the image converter section and feeding these with a current of sawtooth form. In this case, compensation for the distortions resulting from the lines of force of the deflection space encroaching directly into the image section can readily be effected, since the distortion of the deflection fields by eddy currents is reduced. By this means the range of application of the image-orthicon tube may be extended to numbers of lines for which the tube was originally unsuitable. By using the latter means a distinct improvement of the resolution to 8 mc./s. is attained.

What is claimed as new and desired to be secured by Letters Patent is:

1. A focusing and deflection system for a storage tube of the image orthicon type having a cathode ray section and an image section, comprising, in combination, deflection coil means arranged within an annular space surrounding the cathode ray section; focusing coil means surrounding at least the cathode ray section and said deflection coil means; and electrically continuous tubular screen means of electrically highly conductive non-magnetic material arranged at least between said focusing coil means and said deflection coil means and surrounding at least said cathode ray section, for improving the resolution of the tube by elimination of stray field effects in the image section.

2. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least part of the length of the image section and said deflection coil means; and electrically continuous tubular screen means of electrically highly conductive non-magnetic material arranged at least between said focusing coil means and said deflection coil means and surrounding at least said cathode ray section and the part of the image section which is surrounded by said focusing coil means, said tubular screen means being composed of at least two coaxial electrically continuous tubular portions axially spaced from each other at least in the area of the tube where the transition from cathode ray section to image section occurs, for improving the resolution of the tube by elimination of stray field effects in the image section.

3. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and electrically continuous tubular screen means of electrically highly conductive non-magnetic material arranged at least between said focusing coil means and said deflection coil means and surrounding at least said cathode ray section and the image section, said tubular screen means being composed of at least two electrically continuous coaxial tubular portions axially spaced from each other at least in the area of the tube where the transition from cathode ray section to image section occurs, for improving the resolution of the tube by elimination of stray field effects in the image section.

4. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two coaxial electrically continuous tubular portions axially spaced from each other at least in the area of the tube where the transition from cathode ray section to image section occurs, for improving the resolution of the tube by elimination of stray field effects in the image section.

5. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two coaxial electrically continuous tubular portions axially spaced from each other at least in the area of the tube where the transition from cathode ray section to image section occurs, said first and second portions of said tubular screen means having annular end portions joining said first and second portions with each other and covering the respective ends of said focusing coil means, for improving the resolution of the tube by elimination of stray field effects in the image section.

6. A focusing and deflection system for a storage tube of the image orthicon type having a cathode ray section and an image section, comprising, in combiniation, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two electrically continuous coaxial tubular portions axially spaced from each other to form an annular gap therebetween which starts in the area of the tube where the transition from cathode ray section to image section occurs and extends over at least part of the length of said image section, for improving the resolution of the tube by elimination of stray field effects in the image section.

7. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two coaxial electrically continuous tubular portions axially spaced from each other to form an annular gap therebetween which starts in the area of the tube where the transition from cathode ray section to image section occurs and extends over at least part of the length of said image section, said first and second portions of said tubular screen means having annular end portions joining said first and second portions with each other and covering the respective ends of said focusing coil means, for improving the resolution of the tube by elimination of stray field effects in the image section.

8. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two coaxial electrically continuous tubular portions axially spaced from each other to form an annular gap therebetween which starts in the area of the tube where the transition from cathode ray section to image section occurs and extends over the length of said image section, for improving the resolution of the tube by elimination of stray field effects in the image section.

9. A focusing and deflection system for a storage tube of the image orthicon type having a cathode ray section and an image section, comprising, in combination, deflection coil means arranged within an annular space surrounding the cathode ray section; focusing coil means surrounding the cathode ray section, at least the length of the image section and said deflection coil means; and tubular screen means of electrically highly conductive non-magnetic material having a first portion surrounding said focusing coil means and a second portion arranged between said focusing coil means and said deflection coil means and surrounding at least said cathode ray section and the image section, said second portion of said tubular screen means being composed of at least two coaxial electrically continuous tubular portions axially spaced from each other to form an annular gap therebetween which starts in the area of the tube where the transition from cathode ray section to image section occurs and extends over the length of said image section, said first and second portions of said tubular screen means having annular end portions joining said first and second portions with each other and covering the respective ends of said focusing coil means, for improving the resolution of the tube by elimination of stray field effects in the image section.

References Cited in the file of this patent

UNITED STATES PATENTS

| | | |
|---|---|---|
| 2,172,733 | Federmann | Sept. 12, 1939 |
| 2,617,954 | Rose | Nov. 11, 1952 |
| 2,887,594 | Rotow | May 19, 1959 |

FOREIGN PATENTS

| | | |
|---|---|---|
| 715,482 | Great Britain | Sept. 15, 1954 |